(12) United States Patent
Hoanca et al.

(10) Patent No.: US 7,986,816 B1
(45) Date of Patent: Jul. 26, 2011

(54) METHODS AND SYSTEMS FOR MULTIPLE FACTOR AUTHENTICATION USING GAZE TRACKING AND IRIS SCANNING

(75) Inventors: Bogdan Hoanca, Anchorage, AK (US); Kenrick Mock, Anchorage, AK (US)

(73) Assignee: University of Alaska, Fairbanks, AK (US)

( * ) Notice: Subject to any disclaimer, the term of this patent is extended or adjusted under 35 U.S.C. 154(b) by 971 days.

(21) Appl. No.: 11/862,914

(22) Filed: Sep. 27, 2007

Related U.S. Application Data

(60) Provisional application No. 60/827,178, filed on Sep. 27, 2006.

(51) Int. Cl.
 *G06K 9/00* (2006.01)
(52) U.S. Cl. ......... 382/115; 382/209; 382/280; 382/302
(58) Field of Classification Search ................... 382/103, 382/115, 117, 221; 351/209
 See application file for complete search history.

(56) References Cited

U.S. PATENT DOCUMENTS

| | | | |
|---|---|---|---|
| 5,291,560 A | 3/1994 | Daugman | |
| 5,559,961 A | 9/1996 | Blonder | |
| 5,614,967 A * | 3/1997 | Ishikawa et al. ............... | 351/210 |
| 5,644,642 A | 7/1997 | Kirschbaum | |
| 5,861,940 A | 1/1999 | Robinson et al. | |
| 6,120,461 A | 9/2000 | Smyth | |
| 6,134,339 A | 10/2000 | Luo | |
| 6,714,665 B1 | 3/2004 | Hanna et al. | |
| 6,758,563 B2 | 7/2004 | Levola | |
| 7,161,468 B2 * | 1/2007 | Hwang et al. ................ | 340/5.82 |
| 7,657,062 B2 * | 2/2010 | Pilu ............................... | 382/103 |
| 2002/0152034 A1 * | 10/2002 | Kondo et al. .................... | 702/19 |
| 2003/0152252 A1 * | 8/2003 | Kondo et al. ................... | 382/117 |
| 2005/0270386 A1 * | 12/2005 | Saitoh et al. .................. | 348/239 |
| 2006/0098097 A1 * | 5/2006 | Wach et al. ............. | 348/207.99 |
| 2006/0111125 A1 * | 5/2006 | Karaoguz ................ | 455/456.2 |
| 2006/0210122 A1 * | 9/2006 | Cleveland et al. ............ | 382/117 |
| 2007/0061590 A1 * | 3/2007 | Boye et al. .................... | 713/186 |
| 2007/0241861 A1 * | 10/2007 | Venkatanna et al. ......... | 340/5.52 |

OTHER PUBLICATIONS

Bednarik, T. Kinnunen, A. Mihaila, and P. Franti, "Eye-movements as a biometric," In Proceedings of the 14th Scandinavian Conference on Image Analysis, SCIA 2005, Joensuu, Finland, Jun. 19-22, 2005. Lecture Notes in Computer Science, 3540:780-789, Springer (2005).
Chen, C. A. Bouman, and J. C. Dalton, "Hierarchical browsing and search of large image databases," IEEE Transactions on Image Processing, 9(3) (Mar. 2000).
Chen, C. H., "Fusion of face and iris features for multimodal biometrics," Advances in Biometrics, Springer Berlin / Heidelberg, ISSN 0302-9743 (Print) 1611-3349 (Online), 3832:571-580 (2005).
Daugman, "High confidence visual recognition of persons by a test of statistical independence," IEEE Transactions on Pattern Analysis and Machine Intelligence, 15(11):1148-1161 (1993).

(Continued)

*Primary Examiner* — Wesley Tucker
*Assistant Examiner* — Aklilu k Woldemariam
(74) *Attorney, Agent, or Firm* — Ballard Spahr LLP

(57) ABSTRACT

Methods and systems for multiple factor authentication combining eye tracking hardware with iris scanning. The resulting multiple factor authentication is a highly secure and highly accurate authentication procedure. Iris scanning provides excellent identification and eye tracking provides the information that the iris is live and provides identification capabilities based on the eye movement itself while enabling gaze-based password entry.

21 Claims, 6 Drawing Sheets

OTHER PUBLICATIONS

Daugman, "How Iris Recognition Works," Retrieved on Sep. 12, 2006 at http://www.cl.cam.ac.ulc/—jgd1000/irisrecog.pdf.

Davis, F. Monrose, and M. Reiter, "On user choice in graphical password schemes," *Proceedings of the 13th* USENIX Security Symposium San Diego, CA, USA (Aug. 9-13, 2004).

Entry on retinal scanning on the web site of Court Technology Laboratory Retrieved on Sep. 12, 2006 at http://ctl.ncsc.dni.usibiomet%20web/BMRetinal.html.

Hembrooke, M. Feusner, and G. Gay, "Average scan patterns and what they can tell us, late breaking results paper," Proceedings of the Eye Tracking and Research Applications, p. 41 (ETRA'06) (Mar. 2006).

Hoanca and K. Mock, "Screen oriented technique for reducing the incidence of shoulder surfing," Proceedings of Security and Management (SAM'05), Las Vegas, NV (Jun. 20-24, 2005).

Hoanca and K. Mock, "Secure graphical password entry system for access from high-traffic public areas," Late Breaking Results Paper, Proceedings of the Eye Tracking and Research Applications (ETRA'06) (Mar. 2006).

Hopper and M. Blum, "A secure human-computer authentication scheme," CMU Tech Report CMU-CS-00-139. Retrieved on Feb. 14, 2005 at http://www.andrew.cmu.edu/user/abender/humanaut/links.html.

Hyrskykari, "Detection of comprehension difficulties in reading on the basis of word frequencies and eye movement data," Proc. 12th European Conference on Eye Movements (ECEM 12), Dundee, Scotland, PB 13 (2003).

Jansen, "Authenticating mobile device users through image selection," The Internet Society: Advances in Learning, Commerce and Security, K. Morgan & M. J. Spector (Editors), 30:10 (2004).

Jermyn, A. Mayer, F. Monrose, M. Reiter, and A. Rubin, "The design and analysis of graphical passwords," 8th USENIX Security Symposium (1999).

Kasprowski, "Eye movements in biometrics," Springer Berlin / Heidelberg, ISSN 0302-9743 (Print) 1611-3349 (Online), 3087:248-258 (2004).

Kent, Malaysia car thieves steal finger, BBC News, Kuala Lumpur. Retrieved on Sep. 12, 2006 at http://news.bbc.co.itIc/2/hi/asia-pacific/4396831.stm.

Microsoft's Wireless IntelliMouse Explorer with Fingerprint Reader, retrieved online on Feb. 4, 2005 at http://www.microsoft.com/hardware/mouseandkeyboard/productdetails.aspx?pid=03.

Proenca, "Iris segmentation methodology for non-cooperative recognition," IEE Proceedings—*Vis. Image Signal Process.* ,153(2):199-205 (Apr. 2006).

Scheeres, "Airport Face Scanner Failed," *Wired News*, May 16, 2002, retrieved on Feb. 4, 2005 online at http://www.wired.com/news/privacy/0,1848,52563,00.html.

Sobrado J.C. and Birget, "Shoulder surfmg resistant graphical passwords," Retrieved on Sep. 29, 2005 at http://clam.rutgers.edu/-birget/grPssw/srgp.pdf.

Sung, "Towards non-cooperative iris recognition systems," IEEE, 7th International Conference on Control, Automation, Robotics and Vision, 2002. Singapore 2:990-995 (2002).

Thalheim J. Krissler and P.-M. Ziegler. "Body check: Biometrics defeated," c't Magazine. Retrieved Sep. 9, 2006 from http://www.extremetech.com/print_article/0,3428,a=27687,00.asp Jun. 3, 2002.

Thorpe and P. van Oorschot, "Graphical dictionaries and the memorable space of graphical passwords," Proceedings of the 13th USENIX Security Symposium, San Diego, USA, 135-150 (Aug. 9-13, 2004).

Titsworth, T., "More than face value: airports and multimedia security," IEEE MultiMedia 11-13 (2002).

Tseng, "Comparison of holistic and feature based approaches to face recognition," Masters of Applied Science in Information Technology Thesis, School of Computer Science and Information Technology, Faculty of Applied Science, Royal Melbourne Institute of Technology University, Melbourne, Victoria, Australia (Jul. 2003).

Wiedenbeck, J. Water, J. C. Birget, A. Brodskiy, and N. Memon, "Authentication using graphical passwords: effects of tolerance and image choice," Proceedings of the Symposium on Usable Privacy and Security (SOUPS), Pittsburgh, PA, USA (Jul. 6-8, 2005).

Young, Boffins use Play-Doh to fool biometrics, posted on vnunet.com Dec. 13, 2005, Retrieved on Sep. 12, 2006 at http://www.itweek.co.ulchnunet/news/2147491/hackers-play-doh-fool.

* cited by examiner

FIG. 3

| $p_2$ | $p_2$ | $p_2$ |
|---|---|---|
| $p_2$ | $p_1$ | $p_2$ |
| $p_2$ | $p_2$ | $p_2$ |

METHODS AND SYSTEMS FOR MULTIPLE FACTOR AUTHENTICATION USING GAZE TRACKING AND IRIS SCANNING

CROSS REFERENCE TO RELATED PATENT APPLICATIONS

This application claims priority to U.S. Provisional Application 60/827,178 filed Sep. 27, 2006, herein incorporated by reference in its entirety.

BACKGROUND

In the post-September 11 era, security is becoming more and more critical. An important component of information security is user authentication, the ability of an information system to certify that a user is who she claims she is. Authentication can involve one of two processes: identification or verification. For identification, identifying information from an unknown user must be compared against similar information for all possible users. The best match is returned within a confidence level. For verification, a user identity (entered as a user name for example) must be compared only against an existing signature (usually a password) stored for that user. While identification is important for database searches, for example to locate a person based on fingerprints left at a crime scene, most information systems implement authentication as verification. A user types in their user name or scans an identification card, then enters a password to verify the identity. Authentication as verification is used for both physical access (for example to secure areas) and for online access (for example to log in to a computer terminal). Secure user authentication requires that users be endowed with credentials which are i) unique for each user, ii) not easily stolen or lost and iii) reasonably affordable and iv) convenient to use. The order above is not an indication of importance of the various requirements.

It might not be obvious that the four requirements listed above are conflicting. No one technology has been demonstrated that can offer the perfect solution, meeting all of the four requirements simultaneously. The challenge is compounded with the proliferation of mobile networks that expose users to an increased volume of external threats. More and more users need to access many more different information systems, often from public or unsecured computers, and sometimes over unsecured network connections. Additionally, users need to access multiple information systems, each with different authentication mechanisms, which increases the number of credentials the user must carry (and the likelihood that some of the credentials will get lost). Finally, as users need to carry an ever larger number of credentials, the cost increases and the convenience decreases.

SUMMARY

Iris scanning a robust technique for biometric authentication. A weakness of iris scanning is that it can be foiled using a printed iris image. Provided are methods and systems that can reduce the possibility of using such fake iris attacks by combining iris scanning with eye tracking.

Eye tracking hardware can allow a user to control the position of a mouse cursor on the computer screen by the gaze point. The hardware can take real time images of the eye and determine the direction of the gaze point based on the relative position of the eye pupil with respect to a fixed reference (a reflection on the cornea of a fixed light source integrated with the eye tracking camera). Eye tracking itself can be used as a biometric trait for authentication, by extracting statistical information about the eye movement while the user follows on-screen prompts.

By combining eye tracking hardware with iris scanning, the resulting multiple factor authentication is a highly secure and highly accurate authentication procedure. Iris scanning provides excellent identification and eye tracking provides the information that the iris is live and provides identification capabilities based on the eye movement itself while enabling gaze-based password entry.

The imaging system can be very similar for both iris scanning and eye tracking. Both systems can use near infrared illumination. Generally, the eye should be large enough to fill most of the field of view, with the iris covering about 100-400 pixels of the camera image.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention:

FIG. 3 illustrates a probability distribution function (PDF) for an estimated gaze point;

DETAILED DESCRIPTION

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey an indication of a preferred or ideal embodiment.

The present invention may be understood more readily by reference to the following detailed description of preferred embodiments of the invention and the Examples included therein and to the Figures and their previous and following description.

Figure 1:
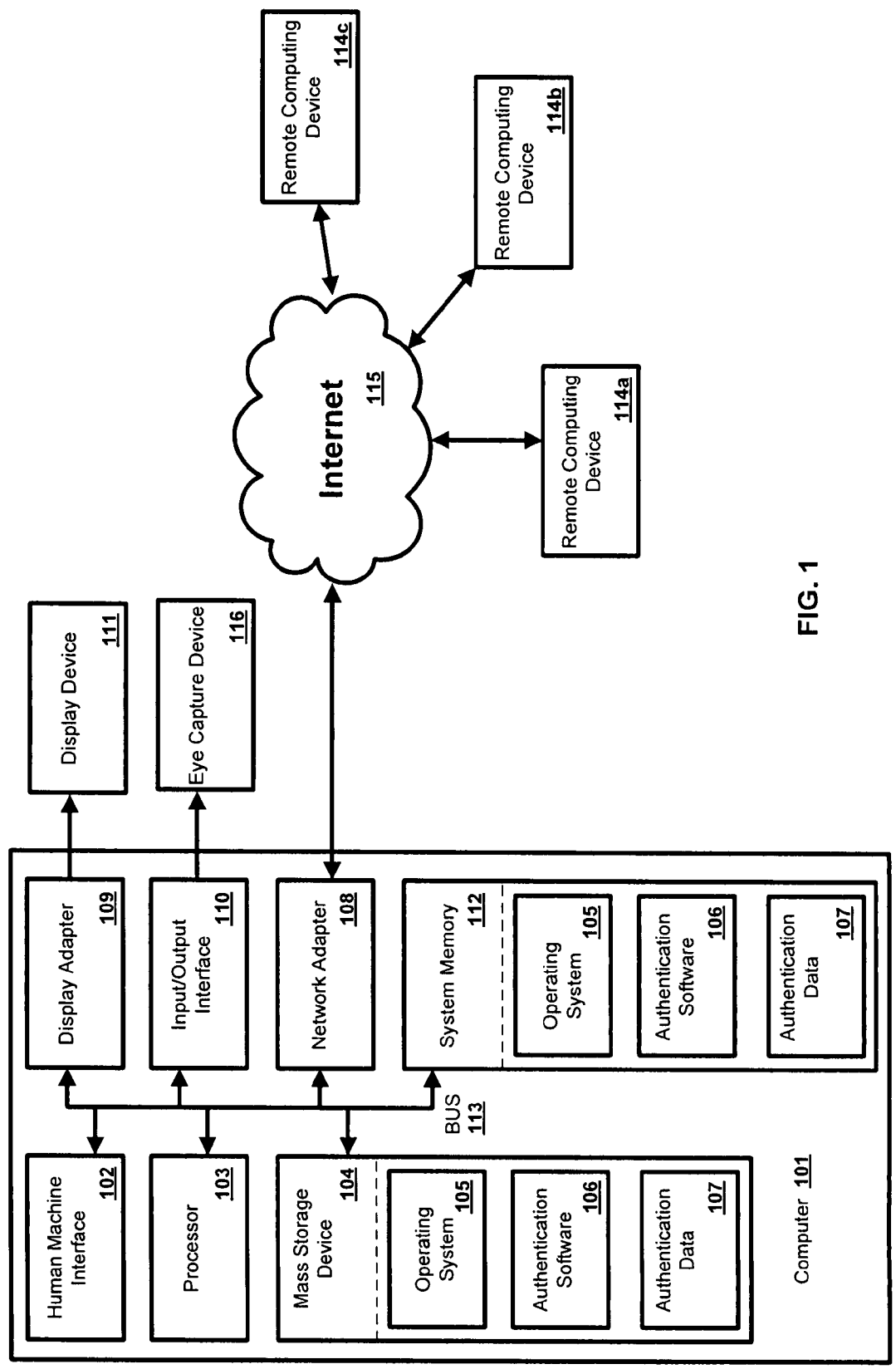
FIG. 1 is an exemplary operating environment.

FIG. 1 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The system and method of the present invention can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the system and method of the present invention can be described in the general context of computer instructions, such as program modules, being executed by a computer. Generally, program modules comprise routines, programs, objects, components, data structures, etc. that perform particular tasks or implement particular abstract data types. The system and method of the present invention can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, authentication software 106, authentication data 107, a network adapter 108, system memory 112, an Input/Output Interface 110, a display adapter 109, a display device 111, and a human machine interface 102, can be contained within one or more remote computing devices 114*a,b,c* at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as authentication data 107 and/or program modules such as operating system 105 and authentication software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and authentication software 106. Each of the operating system 105 and authentication software 106 (or some combination thereof) can comprise elements of the programming and the authentication software 106. Authentication data 107 can also be stored on the mass storage device 104. Authentication data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In another aspect, the user can provide an image or video of the user's eye through eye capture device 116. Eye capture device 116 can be, for example, a digital camera, an iris scanner, a retinal scanner, or any other device suitable for obtaining one or more images of one or more eyes, or portions thereof. Eye capture device 116 can be used for iris scanning and eye tracking. Alternatively, multiple eye capture devices 116 can be used for iris scanning and eye tracking.

In yet another aspect of the present invention, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110.

In some aspects, the computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of authentication software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems of the present invention can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Information security can be a critical consideration in the design of information systems. With the advent of ubiquitous mobile networks and the increased use of computers in public places, new and more stringent security requirements are needed.

There are three well-established forms of user authentication currently in use. They include: i) something the user knows and enters at a computer keyboard or with a mouse on a graphical display (passwords), ii) something the user carries encoded on her body as a biometric trait (biometrics) or iii) something the user carries with her, for example information encoded on a magnetic access card, chip or other physical device (hardware tokens). Several of these techniques can be combined to increase the security of a system, referred to herein as multiple factor authentication.

Among the three authentication options above, passwords are the most commonly used method because of their low cost and ease of use. They do not require any special hardware, are easily changed and always available (unless the user forgets his password, which is one of the drawbacks). Alternatively, passwords can be insecure if users select weak, easy to guess passwords, if users write down passwords in places where attackers can find them, or if the users are not careful about when and how they enter the password. A malevolent observer who watches or records the user entering a password without the user's knowledge will be able to get a hold of even the strongest password. The danger of this information leak, alternately called "shoulder surfing" or "peeping attack" is highest in the case of authentication from crowded public areas, where multiple observers may be watching or even recording several access sessions, then using this information to recover passwords.

To quantify how good passwords are, the metric is "cryptographic complexity," an indication of how difficult to guess a password may be. Intuitively, if a password includes eight printable characters (of a set of 95 possible values), the cryptographic complexity is higher than if the password is a dictionary word, which might be shorter than eight letters and include only characters a-z. The cryptographic complexity is a measure of how large of a space is used to create the password. For the first example above, the space includes $96^8 \cong 7 \cdot 10^{15}$ possible combinations, while the eight letter words amount to significantly fewer than 0.01% of this number of combinations. No matter how good the password is, if an attacker is able to record the user when she is entering the password, the system security is compromised.

Among the other two authentication options, physical cards are moderately expensive, relatively convenient to use, but are more likely to be lost or misplaced. The price of smart cards, USB tokens and RFID cards has been decreasing steadily, making such authentication options ever more affordable. On the other hand, hardware tokens can quickly become inconvenient if several such devices are needed in order to access the various information systems a user might need to use. Additionally, the process of assigning and maintaining a large number of different tokens is also impractical for the administrator of the information system.

A similar consideration applies to the management of systems requiring large numbers of passwords. When faced with the need to memorize several different passwords for different information systems, users either write them down (an insecure practice), they confuse passwords across different information systems, or they forget their passwords. In the last two situations mentioned, the systems administrator must provide assistance with resetting passwords, a costly process which also reduces the security of the system. Any time a password must be reset, it is either set to a random value which needs to be sent to the user (with risks associated with information loss while the password is in transit) or it is set to a default value (which is more easily guessed by attackers).

Biometric identification techniques such as face scanners and particularly fingerprint readers are convenient, because the user will always carry the authentication information with them. Biometric credentials do not require users to memorize anything, nor to carry several objects as credentials for authentication. For this convenience, biometric techniques for authentication have been steadily gaining in popularity. However, some of the biometric identification methods are still prone to false positive and false negative identification. Attacks against biometrics include synthetic data (a fake biometric, for example made out of plastic), recording data from a real authentication session and playing it back later on (this is known as replay attacks), or attacking the database of biometric data to give access to a biometric of the attacker. Moreover, some users do not possess certain biometrics (for example, people with missing fingers, etc). Most problematically, several privacy groups have also expressed concerns over the potential theft of biometrics, or the gathering and sharing of personal biometric data. This is even more troubling given the persistence of biometrics: if a biometric trait is compromised, it cannot be replaced or reset.

I. Iris Scanning

Eye related biometric data can be been used for user authentication. For example, iris recognition and retinal scan. Iris recognition relies on the fact that the human iris exhibits unique patterns that can be used to identify the user (and even to identify the left eye from the right eye of the same person). A high resolution camera can capture an image of the iris and compare that image with a reference signature. Iris scanning has not exhibited any false positives in 9.1 million comparison tests, even when used in identification mode. A similar approach can be based on retinal scanning, where the unique pattern is that of the blood vessels on the back of the eye. Iris scanning is susceptible to attacks, because a high resolution photograph of the iris can be substituted for a live eye. The retinal scan is not susceptible to such attacks, but requires much more complex imaging devices, and even requires that users place their eye on a specially designed device, which could cause discomfort to some users.

Iris scanning is based upon individual differences in the trabecular meshwork of the eye. This tissue manifests itself as the radial lines across the iris and it develops in a chaotic manner after the seventh month of gestation, which means that even identical twins will have different iris patterns. To perform iris scanning, an image of the eye is captured and the location of the iris determined. Areas of obstruction, e.g. from an eyelid, must be discarded. Next, the useful area is partitioned into segments and converted into binary digits. An exemplary method for iris recognition is described in U.S. Pat. No. 5,291,560, incorporated by reference in its entirety. The image of the iris can be partitioned into eight concentric rings, and a Gabor filter applied to each ring, resulting in a transformation of pixels into a 2048 bit code that represents an iris. Authentication can be achieved by computing a Hamming distance between a stored bit code and the bit code of the target iris. A sufficiently small Hamming distance results in a successful authentication.

II. Eye Tracking for Password Entry

Figure 2:
FIG. 2 provides examples of graphical passwords with multiple tile image (left) and with points on a single image (right)

Passwords entered as text from a computer keyboard were the first authentication method. They continue to be the preferred method because of the low cost and ease of use. More recently, graphical passwords have been proposed, as being easier to recall, less likely to be written down and also potentially able to provide a richer space than the limited letters and symbols of text based passwords. For example, the user might authenticate by selecting with mouse clicks a series of points on an image, or a series of tiles in a tiled image. Exemplary schemes are illustrated in FIG. 2. A variation of this is to require the user to choose several images among the set presented on each screen. Another approach to using graphical passwords is a "Draw a Secret" scheme in which the user draws lines or shapes that constitute the password. The strength of the graphical passwords is strongly dependent on the number of points to select or the number of strokes in the drawing (more often limited by the number of short strokes).

FIG. 2 illustrates examples of graphical passwords with multiple tile image (left) and with points on a single image (right). The user selects a face out of a series of faces for their password. The images of faces selected here are all in the public domain from http://teachpol.tcnj.edu/amer_pol_hist/. To enter a password in the single image approach, the user clicks on a series of predetermined points in the image. The password points, indicated by white circles in the figure on the right, are not visible in an actual authentication scenario.

Both the text and the graphical password entry systems suffer from a common weakness. The user needs to be aware of her surroundings when entering a password, in case somebody is watching and recording the keystrokes or the images selected. This type of attack has been called "shoulder surfing" or "peeping attack." No matter how good the password is, if somebody is able to record the user when she is entering the password, the system security is compromised. Graphical passwords may be even more susceptible to shoulder surfing, because images are likely to be much larger than the size of the typical text characters on a screen or on a keyboard.

Clearly, the danger of shoulder surfing is highest in high traffic areas, for example in airports where an authorized user needs to enter an access code to open an access door to a secure area, while a large crowd could be passing by or waiting next to the door. Another critical environment is at an automated teller machine (ATM) where many customers could be lined up awaiting their turn to access the machine. As the user is entering the password, multiple assailants closely located might be observing the password entry simultaneously, or may even record the password entry process using hand-held cameras and then later play it back at slow motion to observe the password entry sequence.

Several authentication techniques have been proposed that can reduce the danger of shoulder surfing. Some involve the use of special screen filters and guards, the use of screens with narrow viewing angles, or the use of special hardware. Other techniques require the user to aggregate in his head information across multiple areas on the screen and to make an entry based on the aggregate information. For example, the user can either enter a number (e.g., the sum of numbers associated with the letters in the password) or click on a graphical symbol or area of the screen that is somehow related to symbols that are part of the password. If the number of possible letters or symbols that would lead to a particular sum or to a particular click action is large enough, the danger of shoulder surfing could be reduced. An observer that has full information about the information the user entered would still have to exhaustively explore all possible combinations that would have led to the user entering such information, which might be impractical. The attacker would have to do a more comprehensive search or to observe several authentication sessions to obtain the user's password.

Eye tracking hardware can be used to provide a secure way to enter user passwords. An eye tracking based "hands free mouse" can allow the user to interact with objects on a computer screen (including entering a password) without giving away much information to an observer. The on screen feedback can be eliminated if the user controls objects with her gaze location. Thus eye tracking hardware can be used to minimize the danger of shoulder surfing. In one aspect, eye tracking hardware can be used without on-screen feedback. In this manner, the user can look at various areas of the screen to select symbols or points on graphical areas and the computer would be able to "see" what the user is selecting. An observer trying to get the same information would have to do one of two things. On one hand, she might have to mount equipment equivalent to the eye tracking hardware, to track the user's gaze. It is unlikely that the user would not notice such equipment, especially since it comes in addition to the eye tracking hardware already on the computer. Alternatively, the attacker must gain access to the eye tracking hardware on the computer. If the computer has been compromised to such a degree, the attacker can easily install a key logger or screen recorder that would capture any kind of information entered by the user; shoulder surfing is only a minor concern in comparison with this.

The eye tracking camera can also allow real time monitoring of the user area, to warn about suspicious people looking at the user's screen, or to detect whether the user was under coercion or was willingly entering the password on the screen. Thus, eye tracking devices can allow access from a crowded public area, with numerous potential attackers located at various incidence angles to the user, without allowing an attacker to see what the user is selecting on screen as a password.

One of the main complaints against using eye tracking devices as a user interface has been the so-called "Midas touch," after the character from the Greek mythology who was cursed to turn into gold anything he touched. When using eyes to control objects on the computer screen, the danger is that any button or control the user will look at might be triggered by the gaze, whether this was the intention of the user or not. As such, in some aspects, the eye tracking interface can be used as a pointing tool and can be assisted by an additional mechanism for selecting objects, either via a physical button click, voice command, or through eye fixation time upon the item to be selected. The threshold for fixation can be, for example, in a range from about 800 ms to about 2000 ms to accurately convert fixation to object selection.

An eye gaze tracking system can be equally accessible to people with various levels of typing abilities, with impaired control of their fingers and hands, or simply to people carrying something through the secured access door (weapons, luggage, etc) that limits their freedom of hand movement. The user can simply walk to a gaze tracking enabled computer and start to use the system. If calibration is required for using the eye tracking hardware, this can be integrated in the log on procedure. The user can perform the calibration, then use the eye tracking equipment to log on, and finally proceed with using the computer with eye tracking capabilities.

A drawback of current eye tracking systems is the relatively high probability of error in selecting desired screen areas, especially if the eye tracking hardware needs to operate without on-screen feedback. In one aspect, provided herein are methods and systems that bridge the gap between the current technological limitations of eye tracking hardware and the capabilities needed for using eye tracking for authentication in graphical user interfaces. Provided are methods and systems that can utilize graphical interfaces where the user authentication requires i) selecting specific locations from a single image or ii) selecting tiles from a tiled composite image.

Secure password entry via gaze tracking can be accomplished in many ways. FIG. 2 describes how a single image may be used in which the user is expected to focus on points in the image in a specific order, or how a set of tiled images may be used in which the user is expected to focus on tiles in a specific order. Other graphical approaches involve finding three icons scattered on a screen with random icons and looking at any point within the triangle formed by the icons, to finding three symbols randomly placed in a grid of symbols and focusing on the fourth symbol that completes a parallelogram. Note that these last two approaches are resistant to shoulder surfing. If an attacker observes the entered password once then this does not give the attacker enough information to determine the password since the selection icon or symbol will be different in the next (randomly generated) authentication session. However, the password can be broken if multiple authentication sessions are observed. Eye tracking as a means to select the icon or symbol provides further protection so that even a single session is unlikely to be recorded.

A. Single Image Approach

The simplest technique in a gaze tracking system for selecting specific location(s) from a specific picture is to allow the user's gaze to control the active area on the screen, the way a traditional mouse cursor would. In one aspect, for security purposes, no cursor will be displayed on the screen in the active area, but the focus point of the user's gaze can act as an "invisible cursor."

Due to the lack of on-screen feedback as to the location of the cursor, calibration error with eye tracking hardware, and the inherent difficulty remembering a password location down to a specific pixel, a reasonable activation cell size can range from a 5×5 pixel cell to a larger pixel cell such as 10×10, 15×15, 20×20, 25×25, etc.

If the password image has a resolution of 600 by 400 pixels, a 10×10 pixel cell yields 2,400 selectable locations. To increase the cryptographic strength a user can be required to select multiple locations. If the user is required to select 5 locations in sequence then the password space is $(2400)^5$ or $7.9 \times 10^{16}$, which is an order of magnitude stronger than the strength of an 8 character text password created out of the 95 printable characters.

In practice, 2400 selectable locations can be non-distinguishable. Instead, users are likely to select key locations or "points of interest" along the edges of objects or items that stand out. It can be estimated that a typical image can have between 30-50 distinguishable locations that make suitable passwords. This significantly reduces the likely password space to somewhere around $30^n$ where n is the number of locations the user must select. For cryptographic complexity comparable with that of eight printable characters, the number of click points would need to be $8 \cdot \log(95)/\log(30) \approx 11$, which is not unreasonably high.

Although the preceding analysis assumed fixed cell sizes of 10×10 pixels, the "interesting" points can be determined by the user, rather than by the system imposing a rigid grid on the image. Thus, several points can be clustered together, separated by large areas with no "points of interest." This will not affect the cryptographic strength of the password, as long as each image includes sufficient points of interest.

B. Multiple Tile Approach

Another approach to graphical password selection is to successively select individual tile images from a set of image tiles, rather than points on a larger image. As previously discussed, in some aspects, the direction of the user's gaze can point to the image to be selected, and no cursor (feedback) can be displayed on the screen. For a tiled image, a practical number of tiles can be, for example, from about 9 to about 36, although up to several hundred can be used for database search applications.

An issue that should be addressed is the selection of the images to be displayed. Consider a scheme where nine images are shown per screen and the user must select the correct image out of three screens. This means that one of the nine images per screen must always be the same—the password image. What about the remaining eight images?

On the one hand, it is desirable to select the remaining eight images randomly out of a set of N images, where N>>8. However, an attacker that is able to record multiple login sessions will easily be able to determine the password by merely noting which images reappear upon a repeat login sequence. This problem can be alleviated by randomly selecting the eight images only once, and then displaying the same set of images upon a repeat login sequence. An attacker will no longer be able to determine the password by comparing previous login images, but if an attacker is able to determine which of the N images are always presented on each screen this does reduce the password space for an electronic attack. In practice, displaying the entire set of image tiles is reliable. For example, if the number of image tiles is 30, the user will need to go through 11 screens of selection to achieve a cryptographic complexity equivalent to that of a text password with 8 printable characters.

C. Error Handling in Eye-Tracking Systems

The discussion in the previous sections centered around using eye tracking hardware for authentication, but used a relatively naïve approach, replacing the use of a hand driven mouse with that of the eye driven eye tracking hardware. If the eye tracking hardware worked perfectly, the solution would be simple to use and would not require any modifications. In practice, the limited resolution of the eye tracking hardware can introduce errors. Solving this problem can rely on modifications to the traditional authentication approach, making the authentication system aware of the potential limitations and sources of error of the eye tracking hardware.

Using eye tracking for authentication can be user friendly and can be highly secure. The limited accuracy of eye tracking hardware requires special considerations when using such technologies for authentication. The lack of on-screen feedback can make it more critical to tolerate calibration errors as well as users' uncertainty in remembering the exact password. Methods and systems for handling both random errors (due to limitations in sampling the gaze direction for eye tracking) and systematic errors (due to improper calibration or because the user moved his head) are provided.

There are two major sources of error that can arise in the use of eye tracking hardware: random errors and systematic errors. Both of these types of errors can be accounted for, and, to some extent, both types of errors can be corrected. Random errors occur because of the way the eye perceives an image. Even if a subject fixates an image (to select a particular tile or point of an image), the eye is constantly moving. In fact, the movement is required to get a good response of the visual organ. As the eye tracking hardware samples the direction of the eye gaze, the estimated gaze point will be slightly different for each sampling point, even if the user makes the conscious effort of fixating a single point. Moreover, even if the eye would be stationary as it fixates the target point, the eye has a relatively wide angle of focus for the central vision (as opposed to peripheral vision). For people with a wider angle of the central vision range the uncertainty in the estimating their gaze point will be higher.

The second type of eye tracking errors is due to improper calibration. Systematic errors occur when the calibration is faulty and the estimated gaze point is consistently different from the actual gaze point (for example if the gaze point is always below and to the left of the estimated position). Sometimes, such errors can arise not because of a faulty calibration procedure per se, but because the user moved his head or changed the angle of tilt of his head since the last calibration session.

i. Random Errors

Figure 3:
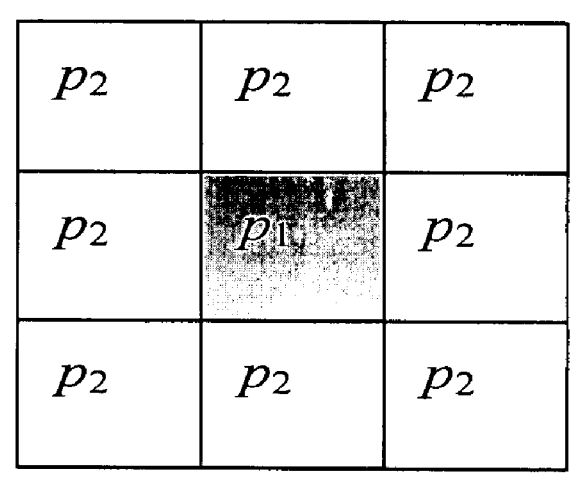

To include the effects of random errors, errors can be modeled as randomly and uniformly distributed (FIG. 3). When the user is fixating the center of a tile, the probability distribution function (PDF) of random error includes a central area where the PDF is of value $p_1$, and a surrounding area where the PDF is of value $p_2$. For simplicity, consider a rectangular grid as shown in FIG. 3, although a circular geometry can more accurately describe the situation. Assume that the random errors are small enough that the PDF is zero outside the immediate neighbors of the fixated cell. The model can easily be extended to remove this assumption. Assume the tiles to have unit areas, for simplicity.

FIG. 3 illustrates a probability distribution function (PDF) for the estimated gaze point from the eye tracking hardware when the user is fixating the center tile. The probabilities are as indicated by the $p_1$ or $p_2$ numbers for the tiles shown, and are zero for tiles more remote from the center tile.

With the PDF above, the probability for the estimated gaze point to be on the same tile as the actual gaze point is $p_1$. The probability that the estimate is on one of the eight neighbors of the actual gaze point is $8p_2$. To normalize the PDF, require that $p_1 + 8\ p_2 = 1$. Assume that the authentication requires selecting points or tiles on S successive screens of data. In this case, call event N the situation when the estimate falls not on the actual fixated tile, but on neighboring tiles. The complementary event A, is that the estimate falls on the actual tile fixated. If the errors are independent and randomly distributed, over the S screens required for one authentication session, the probability to have k exact matches of the estimated and the fixated tile will be given by the well-known binomial distribution:

$$p_{(k)} = \binom{n}{k} p_1^k (1-p_1)^{S-k}.$$

This information can be used to optimize the authentication process in the presence of random errors in two different ways.

In one aspect, if the estimate gaze points follow a pattern AA...A (the estimate matches the actual expected tile for all screens of the authentication session), the password would be accepted, just as in traditional authentication. On the other hand, if the pattern includes only k<S occurrences of event A and also S−k occurrences of event N (estimate falls on a neighbor of the expected tile), the authentication could be deemed successful with a normalized probability given by $$p_{A(k)} = \frac{p(k)}{p(s)}.$$

Consequently, even if the estimate of the user gaze always falls on neighboring tiles and not on the expected ones, there is a probability, albeit small, that the session would be successful.

This "soft reject" relaxes the authentication requirements to account for some of the more likely failures due to random errors. At the same time, any estimate that falls outside the set of immediate neighbors of the expected tile will deem the session as a failed authentication attempt. In fact, to make this "soft reject" process more robust, any attempt where $p_{A(k)} \leq p_{rand}$ (where $p_{rand}$ is the probability of occurrence of the pattern due to a random try) should be automatically deemed as a failed attempt.

In another aspect, the process can be further optimized by considering the errors across successive authentication attempts. If an authentication session does not succeed, the user is likely to attempt a second, and even a third session within a short time. The probability over successive authentication sessions can be evaluated that a given pattern of events A and N is due to chance or due to a legitimate user encountering random errors. If the likelihood of the pattern being caused by errors is high enough, the system can grant access to the user, even though none of the authentication sessions taken individually would be sufficient to grant access.

The impact of the proposed "soft reject" would be to relax the authentication rules, increasing the likelihood that a user would authenticate successfully even in the presence of errors. This will have the undesired effect of increasing false positives, allowing some sessions to succeed even when the user did not know and did not select the correct password.

ii. Systematic Errors

Figure 4:
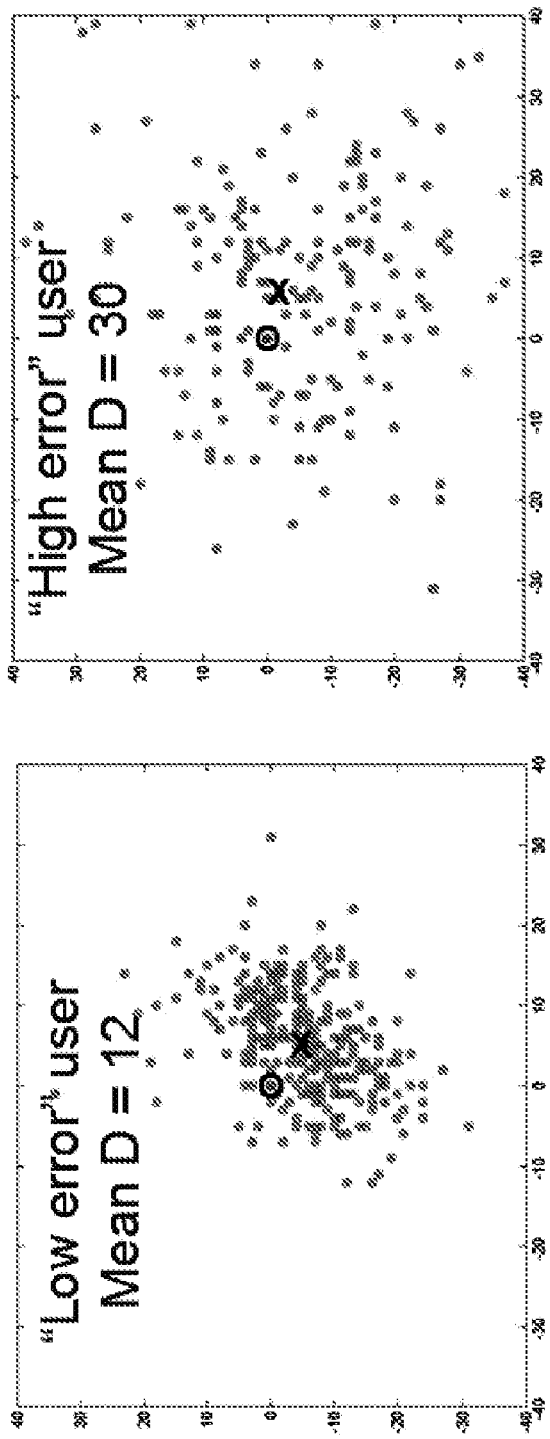
FIG. 4 illustrates scatter plots of gaze points for low error and high error users.

Another type of error likely to occur in eye tracking systems is systematic error. This type of error is when the estimated gaze position and the actual gaze position differ by a constant translation vector. For example the estimate could always be lower and to the right of the actual gaze position (FIG. 4). The cause for such systematic errors could be a change in head position or angle since the last calibration, or a faulty calibration itself.

FIG. 4 illustrates scatter plots of gaze points for low error and high error users. Coordinates are in pixels, relative to the target location (the exact password point, indicated by "o"). Even though the absolute value of the error in the case of the "high error" user is three times larger than for the "low error" user, the center of gravity of the points (indicated by "x," is approximately within the same distance in both cases. This distance can be referred to as the systematic error.

The authentication systems provided can account for such types of errors and automatically correct for them. As described above, the correction can be performed when the estimate falls in neighboring tiles to the expected tile for correct authentication, or can even extend for systematic errors that take the estimate beyond the neighboring tiles. Because the translation vector can be random, accepting truly arbitrary translation vectors can lead to a loss of cryptographic complexity equal to one screen worth of data. In other words, if accepting any magnitude and orientation for the translation vector (difference between the estimated gaze position and the expected position for authentication), a session that would require S screens of selecting data would have the equivalent complexity of a session of S−1 screens with no tolerance for systematic errors.

III. Biometric Eye Tracking

Eye tracking hardware can be used to provide a biometric type of authentication (eye gaze dynamics). Biometric approaches extract user defining information from the statistical behavior of the user's gaze location when the user performs a set of screen oriented commands. There are no passwords to remember, and the scheme is highly resistant to attackers who attempt to fake biometrics.

Eye tracking technologies for authentication can be used to extract user defining information from eye movement patterns themselves. This is in essence a biometric approach, whereby statistical properties of the eye tracking data and not the actual eye gaze locations can identify the user. Ideally, the user might not even need to memorize a password, but can simply gaze at an image and allow the systems to collect and process the gaze patterns.

Existing eye tracking hardware typically consists of an infrared light (IR) source and IR-filtered camera. Both static and dynamic characteristics of eye gaze data can be used. The light source illuminates the eye and the reflection from the cornea produces a bright spot called the "glint" that is used to determine the gaze point. Information that can be extracted as features for authentication includes the change in velocity of the eye in both the X and Y dimensions and the change in diameter of the pupil. The pupil diameter changes as the eye adjusts to changes in illumination and also varies depending upon the age of the subject. The changes in velocity will vary across subjects as they track moving objects and fixate on specific objects. Appropriately constructed images that change in brightness and provide motion for the subject to track can be used to evoke responses in the eye relating to both velocity and pupil diameter. The resulting features can be used for authentication by comparing the velocities and diameters of an unknown subject to those recorded by known users. Additionally, the velocities and diameters must match the properties of real eyes—e.g. a picture of an eye that might pass an iris scan would not track a moving object and dilate the pupil in the manner of a human eye, and authentication would be denied. Measurements can be taken for pupil diameters and eye gaze direction, as well as for time variations of these quantities (variations in pupil diameters and eye gaze velocities). Various combinations of Fast Fourier Transforms (FFTs) and Principal Component Analysis can be used for feature extraction.

Sample images and procedures to collect data for eye tracking as a biometric include, but are not limited to a moving object that the user must track (the computer can record the response time and other statistics of the eye movement), an object that appears in a random area on the screen (the computer records the response time to focus on the object), and an image with a rapidly changing brightness (the computer records speed and magnitude of change in pupil size).

Another strength of this biometric approach is that theft of this type of biometric data would be very unlikely. Fear that fingerprints might be lifted off from drinking glasses or even from biometric check stations, or fear that iris patterns could be reproduced on artificial eyes is currently one of the main reasons why biometrics have not been used more widely. The fear of biometrics theft is compounded with the fear that attackers might cut off fingers or remove eyes from victims to use these body parts for biometric based authentication. If biometric devices can detect whether the finger or eye is alive, this alleviates fears of these last types of attacks.

IV. Exemplary Methods

Provided are methods that can combine eye gaze based password entry with a biometric approach. Iris scanning and eye gaze dynamics can be combined to increase the accuracy of the measurement, while removing user fears that their eyes might be copied or forcefully removed by an attacker. Even if iris scanning alone is vulnerable to attackers using high resolution of the user's iris, this type of attack cannot replicate the behavior of a live eye. A challenge with such a combined approach rests on the different resolutions required for eye tracking (medium) and for iris scanning (medium-high, 70 pixels for the iris radius, or 100-140 pixels preferred). As the price of high resolution digital cameras continues to decrease, the resolution needed for iris scanning may be available and cost effective for eye tracking cameras. The illumination scheme for both eye tracking and iris scanning can be near infrared radiation.

Methods using eye tracking provided herein offer new options for secure authentication. Using eye tracking hardware as a "hands free mouse" without on-screen feedback allows a user to enter information (not limited to passwords) without disclosing it to shoulder surfers. Furthermore, extracting biometric features from eye tracking data, a user can be uniquely identified in a manner that is extremely difficult to replicate. Because the eye tracker requires a real live eye to gather data, an attacker will not be able to record the user and play back the biometric at a later time. Even if a prosthetic eye is built to be used for such purposes, it is unlikely that the fake eye would be able to correctly reproduce the dynamic behavior of the real eye of the user. When combining the biometric of eye dynamics with other biometrics like iris scanning or retinal scanning, the security of the authentication is further increased. Finally, by combining eye tracking dynamics, static eye biometrics (iris or retinal scan) and user password entry via eye tracking without on-screen feedback, the potential is there for a multiple factor authentication with high security and flexibility.

Figure 6:
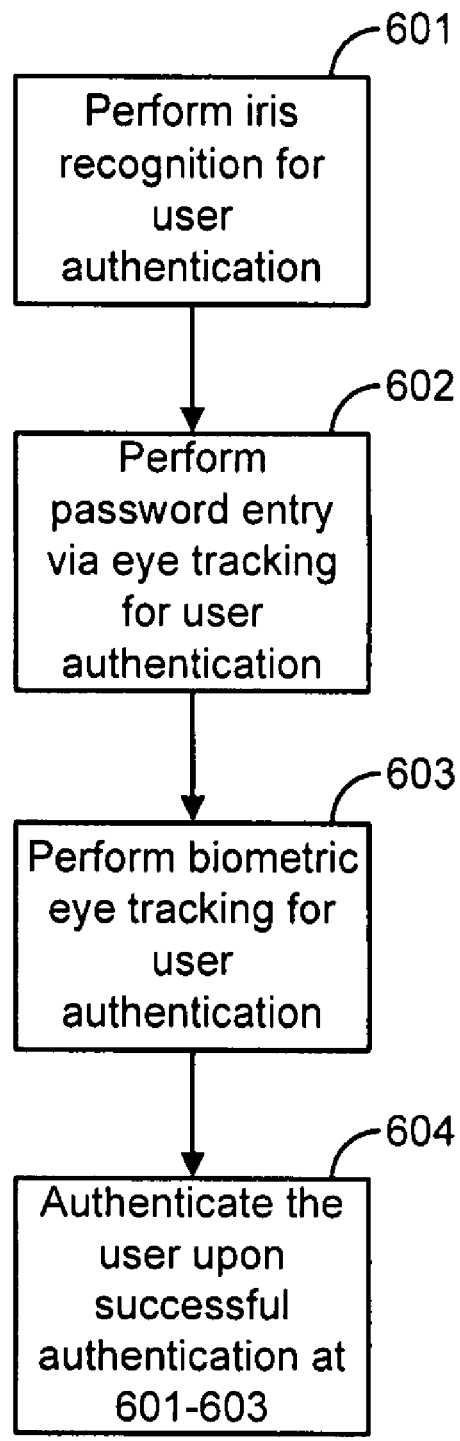
FIG. 6 illustrates an exemplary method of operation.

In one aspect, illustrated in FIG. 6, provided are methods for multiple factor authentication of a user comprising performing, by an authentication system, iris recognition for user authentication at 601, performing, by the authentication system, password entry via eye tracking for user authentication at 602, performing, by the authentication system, biometric eye tracking for user authentication at 603, and authenticating, by the authentication system, the user upon successful authentication at 601-603.

In an aspect, performing iris recognition can comprise capturing an image of an iris of the user, comparing the image with a reference image, and successfully authenticating the user if the image matches the reference image.

In another aspect, performing password entry via eye tracking can comprise determining a plurality of estimated locations where an eye of the user is focused in a series, receiving data associated with the plurality of estimated locations, comparing the received data with a reference password, and successfully authenticating the user if the received data matches the reference password. The methods can further comprise presenting an image to the user, wherein the user is expected to focus on a plurality of specific points in the image in a specific order. The methods can further comprise presenting a set of tiled images to a user wherein the user is expected to focus on specific tiles in a specific order. The methods can further comprise presenting an image of a keyboard to a user wherein the user is expected to focus on specific characters of the keyboard in a specific order.

In another aspect, the methods can further comprise implementing error correction. For example, the methods can comprise determining whether the plurality of estimated locations follows a pattern that comprises k<S occurrences of event A and S-k occurrences of event N, wherein k is the number of locations correctly identified by the user, S is the total number of the plurality of estimated locations, A is an event wherein the estimated location is at a correct location, and N is an event wherein the estimated location is at a neighbor location, determining an authentication probability given by $$p_{A(k)} = \frac{p(k)}{p(s)},$$

comparing the authentication probability to a probability that the occurrence of the pattern is due to a random try, and successfully authenticating the user if the authentication probability is greater than the probability that the occurrence of the pattern is due to a random try.

The probability that the occurrence of the pattern is due to a random try can be determined by $p_{rand(k)} = C_S^k p^k (1-p)^{S-k}$, where $$p = \frac{1}{n},$$

n being the number of possible locations on a screen, and $C_S^k$ is the number of combinations of k elements out of a set of S.

In another aspect, implementing error correction can comprise determining a probability over successive authentication sessions that a given pattern of events A and N is due to a user encountering random errors, wherein A is an event wherein the estimated location is at a correct location, and N is an event wherein the estimated location is at a neighbor location and successfully authenticating the user if the probability of the pattern being caused by errors is above a predetermined threshold. The predetermined threshold can be $p_{rand(k)} = C_S^k p^k (1-p)^{S-k}$, where $$p = \frac{1}{n},$$

n being the number of possible locations on a screen, and $C_S^k$ is the number of combinations of k elements out of a set of S.

In another aspect, implementing error correction can comprise determining whether the plurality of estimated locations differs from a plurality of correct locations by a constant translation vector and successfully authenticating the user if the plurality of estimated locations differs from the plurality of correct locations by the constant translation vector.

In one aspect, performing biometric eye tracking can comprise extracting user defining information from statistical behavior of the user's eye movement. The methods can further comprise presenting an image that changes in brightness and provides motion for the user to track so as to evoke a response in an eye of the user eye relating to velocity and pupil diameter. The methods can still further comprise comparing the velocity and pupil diameter of the user to a velocity and a pupil diameter recorded by a known user.

V. Example

The system used to investigate eye-tracking based authentication was a modified ERICA system manufactured by Eye Response Technologies. The system operated on a notebook PC, and had a resolution of 1024×768 pixels. With a screen tiled in a 8×8 array, the probabilities described above would be approximately $p_1=0.9$, $8p_2=0.1$. For a session requiring three screens for authentication, S=3, the probability that a user would authenticate successfully with the basic technique described above would be approximately 0.73. In contrast, if using the eye tracking aware approach the probability can be increased to 0.81. The cryptographic complexity is reduced by a similar amount, 0.81/0.73=1.11 (less than 0.15 bits of equivalent complexity).

Figure 5:
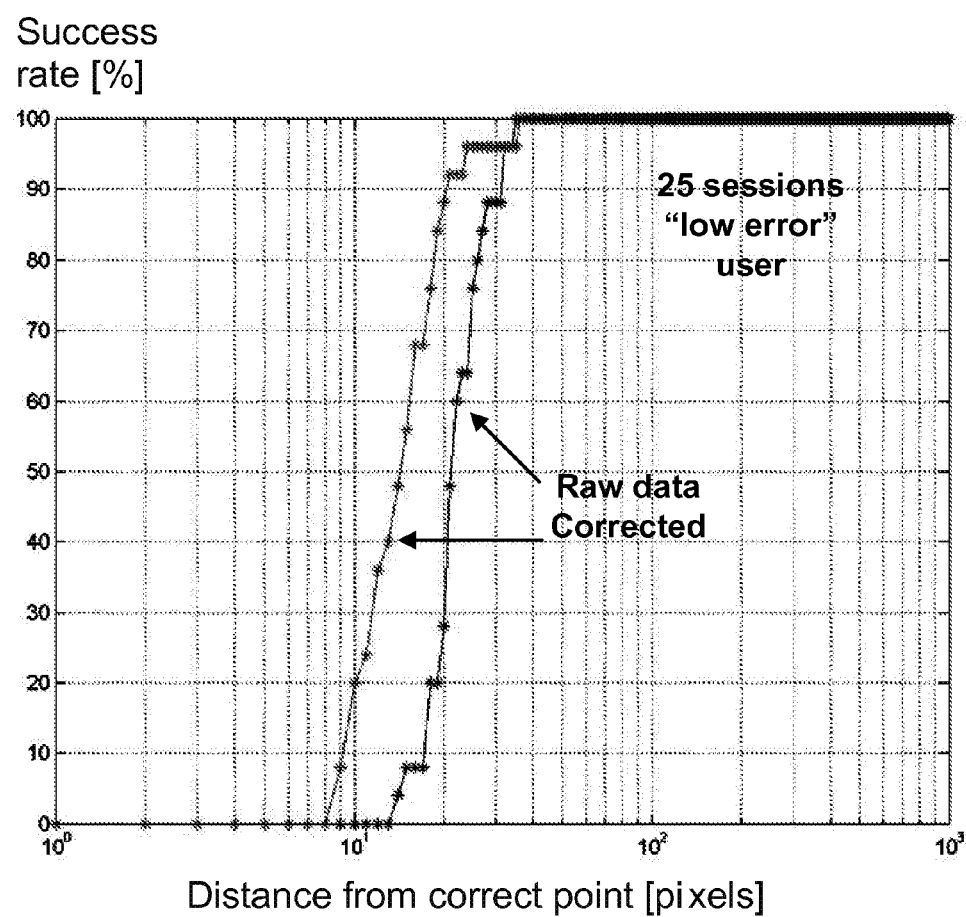
FIG. 5 illustrates success rate as a function of acceptable distance from the correct password point.

Multiple users were used to determine the viability of the authentication methods and systems provided. Users reported taking 3-5 seconds per authentication point, which is slower than the traditional password entry, but comparable with the time necessary for some of the techniques proposed by others for reducing the danger of shoulder surfing. The recognition rates were as high as 90% (after correcting for systematic errors) when the users were required to click within 20 pixels of the actual password (FIG. 5). In most cases, the recognition rate was much lower, even with larger tolerances, especially for users wearing eye glasses (83% for clicking within 80 pixels). There was a tradeoff between increasing the recognition rate and decreasing the cryptographic complexity, since both of these happen with increasing the tolerance. Using averaging to remove the systematic errors increased the recognition rate from 20% to 90% for an accuracy of 20 pixels, but this value is user dependent.

FIG. 5 illustrates success rate as a function of acceptable distance from the correct password point. Passwords where click points are farther away from the correct point than the acceptable distance result in failed authentication sessions. The raw data is as captured by the eye tracking hardware. In the corrected data, the position of the center of gravity of multiple gaze points was calculated, then the systematic error between this position and that of the correct point was subtracted offline to plot the success rate.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for multiple factor authentication of a user comprising:
   a. performing, by a computer, iris recognition for user authentication;
   b. performing, by the computer, biometric eye tracking for user authentication;
   c. performing, by the computer, password entry via eye tracking for user authentication, wherein performing password entry via eye tracking for user authentication comprises;
      determining a plurality of estimated locations where an eye of the user is focused in a series,
      receiving data associated with the plurality of estimated locations,
      comparing the received data with a reference password,
      implementing error correction, wherein the implementing error correction comprises,
      determining whether the plurality of estimated locations follows a pattern that comprises k<S occurrences of event A and S-k occurrences of event N, wherein k is the number of locations correctly identified by the user, S is the total number of the plurality of estimated locations, A is an event wherein the estimated location is at a correct location, and N is an event wherein the estimated location is at a neighbor location,
      determining an authentication probability given by $$p_{A(k)} = \frac{p(k)}{p(s)},$$

comparing the authentication probability to a probability that the occurrence of the pattern is due to a random try, and
      successfully authenticating the user if the authentication probability is greater than the probability that the occurrence of the pattern is due to a random try,
      successfully authenticating, by the computer, the user if the received data matches the reference password; and
   d. authenticating, by the computer, the user upon successful authentication of a-c.

2. The method of claim 1, wherein performing iris recognition comprises:
   capturing an image of an iris of the user;
   comparing the image with a reference image; and
   successfully authenticating the user if the image matches the reference image.

3. The method of claim 1, further comprising presenting an image to the user, wherein the user is expected to focus on a plurality of specific points in the image in a specific order.

4. The method of claim 1, further comprising presenting a set of tiled images to a user wherein the user is expected to focus on specific tiles in a specific order.

5. The method of claim 1, further comprising presenting an image of a keyboard to a user wherein the user is expected to focus on specific characters of the keyboard in a specific order.

6. The method of claim 1, wherein the probability that the occurrence of the pattern is due to a random try is determined by $p_{rand(k)} = C_S^k p^k (1-p)^{S-k}$, where $$p = \frac{1}{n},$$

n being the number of possible locations on a screen, and $C_S^k$ is the number of combinations of k elements out of a set of S.

7. The method of claim 1, comprising:
   determining, by the computer, a probability over successive authentication sessions that a given pattern of events A and N is due to a user encountering random errors, wherein A is an event wherein the estimated location is at a correct location, and N is an event wherein the estimated location is at a neighbor location; and successfully authenticating, by the computer, the user if the probability of the pattern being caused by errors is above a predetermined threshold.

8. The method of claim 7, wherein the predetermined threshold is $p_{rand(k)} = C_S^k p^k (1-p)^{S-k}$, where $$p = \frac{1}{n},$$

n being the number of possible locations on a screen, and $C_S^k$ is the number of combinations of k elements out of a set of S.

9. The method of claim 1, comprising:
determining, by the computer, whether the plurality of estimated locations differs from a plurality of correct locations by a constant translation vector; and
successfully authenticating, by the computer, the user if the plurality of estimated locations differs from the plurality of correct locations by the constant translation vector.

10. The method of claim 1, wherein performing, by the computer, biometric eye tracking comprises extracting user defining information from statistical behavior of the user's eye movement.

11. The method of claim 10, further comprising presenting, by the computer, an image that changes in brightness and provides motion for the user to track so as to evoke a response in an eye of the user relating to velocity and pupil diameter.

12. The method of claim 11, further comprising comparing, by the computer, the velocity and pupil diameter of the user to a velocity and a pupil diameter recorded by a known user.

13. A system for multiple factor authentication of a user comprising:
a display device configured for displaying an image to the user;
an eye imaging device configured for taking an image of an iris of the user and for tracking movement of an eye of the user;
a memory configured for storing a reference image, a reference password, a velocity and a pupil diameter of a known user; and
a processor coupled to the display device, the eye imaging device and the memory, the processor configured for
a. performing iris recognition for user authentication,
b. performing biometric eye tracking for user authentication;
c. performing password entry via eye tracking for user authentication, wherein performing password entry via eye tracking for user authentication comprises;
determining a plurality of estimated locations where an eye of the user is focused in a series,
receiving data associated with the plurality of estimated locations,
comparing the received data with a reference password,
implementing error correction, wherein the implementing error correction comprises,
determining whether the plurality of estimated locations follows a pattern that comprises k<S occurrences of event N, wherein k is the number of locations correctly identified by the user, S is the total number of the plurality of estimated locations, A is an event wherein the estimated location is at a correct location, and N is an event wherein the estimated location is at a neighbor location,
determining an authentication probability given by $$p_{A(k)} = \frac{p(k)}{p(s)},$$

comparing the authentication probability to a probability that the occurrence of the pattern is due to a random try, and
successfully authenticating the user if the authentication probability is greater than the probability that the occurrence of the pattern is due to a random try,
successfully authenticating the user if the received data matches the reference password; and
d. authenticating the user upon successful authentication of a-c.

14. The system of claim 13, wherein the eye imaging device comprises a digital camera coupled with a near infrared light source.

15. The system of claim 13, wherein successful authentication of a-c comprises
matching an image of an iris of the user if the image matches the reference image;
matching a password entered via eye tracking by the user to the reference password; and
matching a velocity and a diameter of eye movement of the user to the velocity and the pupil diameter of the known user.

16. A non-transitory computer readable storage medium for multiple factor authentication of a user comprising computer executable instruction embodied thereon comprising:
a. performing iris recognition for user authentication,
b. performing biometric eye tracking for user authentication;
c. performing password entry via eye tracking for user authentication, wherein performing password entry via eye tracking for user authentication comprises;
determining a plurality of estimated locations where an eye of the user is focused in a series,
receiving data associated with the plurality of estimated locations,
comparing the received data with a reference password,
implementing error correction, wherein the implementing error correction comprises,
determining whether the plurality of estimated locations follows a pattern that comprises k<S occurrences of event A and S-k occurrences of event N, wherein k is the number of locations correctly identified by the user, S is the total number of the plurality of estimated locations, A is an event wherein the estimated location is at a correct location, and N is an event wherein the estimated location is at a neighbor location,
determining an authentication probability given by $$p_{A(k)} = \frac{p(k)}{p(s)},$$

comparing the authentication probability to a probability that the occurrence of the pattern is due to a random try, and successfully authenticating the user if the authentication probability is greater than the probability that the occurrence of the pattern is due to a random try, successfully authenticating, by the computer, the user if the received data matches the reference password; and d. authenticating the user upon successful authentication of a-c.

17. The non-transitory computer readable storage medium of claim 16, wherein successful authentication of a-c comprises matching an image of an iris of the user if the image matches the reference image;

matching a password entered via eye tracking by the user to the reference password; and matching a velocity and a diameter of eye movement of the user to the velocity and the pupil diameter of the known user.

18. A method for multiple factor authentication of a user comprising:
   a. performing, by a computer, iris recognition for user authentication;
   b. performing, by the computer, biometric eye tracking for user authentication;
   c. performing, by the computer, password entry via eye tracking for user authentication, wherein performing password entry via eye tracking for user authentication comprises,
      determining a plurality of estimated locations where an eye of the user is focused in a series,
      receiving data associated with the plurality of estimated locations,
      comparing the received data with a reference password,
      implementing error correction, wherein the implementing error correction comprises,
      determining a probability over successive authentication sessions that a given pattern of events A and N is due to a user encountering random errors, wherein A is an event wherein the estimated location is at a correct location, and N is an event wherein the estimated location is at a neighbor location, and
      successfully authenticating the user if the probability of the pattern being caused by errors is above a predetermined threshold wherein the predetermined threshold is $p_{rand(k)}=C_S^k p^k(1-p)^{S-k}$, where $$p = \frac{1}{n},$$

n being the number of possible locations on a where screen, and $C_S^k$ is the number of combinations of k elements out of a set of S, and successfully authenticating the user if the received data matches the reference password; and d. authenticating, by the computer, the user upon successful authentication of a-c.

19. The method of claim 18, wherein the probability that the occurrence of the pattern is due to a random try is determined by $p_{rand(k)}=C_S^k p^k(1-p)^{S-k}$, where $$p = \frac{1}{n},$$

n being the number of possible locations on a screen, and $C_S^k$ is the number of combinations of k elements out of a set of S.

20. The method of claim 18, comprising:
   determining a probability over successive authentication sessions that a given pattern of events A and N is due to a user encountering random errors, wherein A is an event wherein the estimated location is at a correct location, and N is an event wherein the estimated location is at a neighbor location; and
   successfully authenticating the user if the probability of the pattern being caused by errors is above a predetermined threshold.

21. The method of claim 20, wherein the predetermined threshold is $p_{rand(k)}=C_S^k p^k(1-p)^{S-k}$, where $$p = \frac{1}{n},$$

n being the number of possible locations on a where screen, and $C_S^k$ is the number of combinations of k elements out of a set of S.

\* \* \* \* \*